United States Patent
Nayani et al.

(10) Patent No.: US 11,162,419 B2
(45) Date of Patent: Nov. 2, 2021

(54) METHOD AND STRUCTURE FOR OPERATING ENGINE WITH BOWED ROTOR CONDITION

(71) Applicant: General Electric Company, Schenectady, NY (US)

(72) Inventors: Manoj Nayani, Bangalore (IN); Praveen Sharma, Bangalore (IN); Narayanan Payyoor, Bangalore (IN); Shuvajyoti Ghosh, Bangalore (IN)

(73) Assignee: General Electric Company, Schenectady, NY (US)

( * ) Notice: Subject to any disclaimer, the term of this patent is extended or adjusted under 35 U.S.C. 154(b) by 686 days.

(21) Appl. No.: 15/893,800

(22) Filed: Feb. 12, 2018

(65) Prior Publication Data

US 2019/0249602 A1    Aug. 15, 2019

(51) Int. Cl.
| | |
|---|---|
| F02C 7/06 | (2006.01) |
| F02K 3/06 | (2006.01) |
| F16N 7/40 | (2006.01) |
| F16N 39/02 | (2006.01) |

(52) U.S. Cl.
CPC .................. *F02C 7/06* (2013.01); *F02K 3/06* (2013.01); *F16N 7/40* (2013.01); *F16N 39/02* (2013.01); *F05D 2220/32* (2013.01); *F05D 2260/606* (2013.01); *F16N 2210/02* (2013.01); *F16N 2230/02* (2013.01); *F16N 2270/56* (2013.01)

(58) Field of Classification Search
CPC ... F02C 7/06; F02K 3/06; F16N 39/02; F16N 2210/02; F16N 2270/56; F05D 2220/32; F05D 2260/32; F05D 2260/606
See application file for complete search history.

(56) References Cited

U.S. PATENT DOCUMENTS

| | | | | |
|---|---|---|---|---|
| 3,321,910 A | * | 5/1967 | Davies | F02C 7/16 60/39.08 |
| 3,486,582 A | * | 12/1969 | Carter | F01D 25/20 184/6.3 |
| 4,041,697 A | * | 8/1977 | Coffinberry | F02C 7/14 60/39.281 |
| 4,151,710 A | * | 5/1979 | Griffin | F02C 7/14 60/39.08 |
| 5,610,341 A | * | 3/1997 | Tortora | F01D 17/02 73/756 |
| 5,615,547 A | * | 4/1997 | Beutin | F02C 7/14 60/39.08 |

(Continued)

FOREIGN PATENT DOCUMENTS

| | | |
|---|---|---|
| CN | 103872840 A | 6/2014 |
| CN | 106907192 A | 6/2017 |

(Continued)

OTHER PUBLICATIONS

Chinese Office Action and Search Report Corresponding to Application No. 20191011192 dated Jan. 12, 2021.

*Primary Examiner* — Michael A Riegelman
(74) *Attorney, Agent, or Firm* — Dority & Manning, P.A.

(57) ABSTRACT

A gas turbine engine including a lubricant system defining a lubricant circuit through which a lubricant flows in fluid communication with a bearing assembly of the engine. The lubricant system selectively bypasses thermal communication of the lubricant and a heat sink based at least on a temperature of the lubricant within the lubricant circuit.

18 Claims, 4 Drawing Sheets

(56) References Cited

U.S. PATENT DOCUMENTS

| | | | | |
|---|---|---|---|---|
| 6,487,862 | B1* | 12/2002 | Doorley | F01D 15/06 60/778 |
| 7,287,368 | B2* | 10/2007 | Tumelty | F01D 25/20 184/6.11 |
| 7,544,890 | B2* | 6/2009 | Herborth | B29D 23/001 174/481 |
| 7,858,879 | B2 | 12/2010 | Herborth et al. | |
| 7,984,792 | B2* | 7/2011 | Hoffmann | F01D 25/16 184/6.22 |
| 8,601,792 | B2* | 12/2013 | Mylemans | F01D 25/18 60/267 |
| 8,820,046 | B2* | 9/2014 | Ross | F01D 25/34 60/39.13 |
| 8,944,749 | B2* | 2/2015 | Durocher | F01D 9/065 415/1 |
| 9,046,002 | B2* | 6/2015 | Homeyer | F02C 7/06 |
| 9,472,998 | B2 | 10/2016 | Neuhaus et al. | |
| 9,599,019 | B2 | 3/2017 | Muldoon et al. | |
| 10,082,078 | B2* | 9/2018 | Snape | F02C 7/14 |
| 10,746,222 | B2 | 8/2020 | Steen et al. | |
| 10,815,887 | B2* | 10/2020 | Lighty | F02C 7/12 |
| 10,823,066 | B2 | 11/2020 | Miller et al. | |
| 2006/0076426 | A1* | 4/2006 | Schuetze | F02C 6/16 237/12 |
| 2009/0200114 | A1* | 8/2009 | Bagepalli | F03D 80/70 184/6.22 |
| 2010/0275572 | A1* | 11/2010 | Durocher | F01D 25/18 60/39.08 |
| 2013/0087308 | A1* | 4/2013 | Logan | F02C 7/06 165/51 |
| 2013/0318940 | A1* | 12/2013 | Parnin | F02C 7/06 60/39.08 |
| 2013/0336764 | A1 | 12/2013 | Schmidt | |
| 2014/0255171 | A1* | 9/2014 | Laigle | F01D 25/20 415/175 |
| 2014/0373553 | A1* | 12/2014 | Zaccaria | F02C 7/268 60/778 |
| 2015/0125264 | A1* | 5/2015 | Lighty | F16N 7/385 415/111 |
| 2016/0024964 | A1* | 1/2016 | Weiner | F01D 25/18 415/1 |
| 2016/0333783 | A1* | 11/2016 | Weiner | F02C 3/04 |
| 2016/0348588 | A1* | 12/2016 | Ross | F01D 19/02 |
| 2017/0234158 | A1* | 8/2017 | Savela | F01D 19/02 416/1 |
| 2017/0234166 | A1* | 8/2017 | Dube | F02C 6/14 60/779 |
| 2017/0234167 | A1* | 8/2017 | Stachowiak | B64D 35/00 416/1 |
| 2017/0234231 | A1* | 8/2017 | Virtue, Jr. | F01D 25/34 416/1 |
| 2017/0234232 | A1* | 8/2017 | Sheridan | H02J 7/0068 307/9.1 |
| 2017/0234233 | A1* | 8/2017 | Schwarz | F02C 7/268 60/204 |
| 2017/0234234 | A1* | 8/2017 | Pech | F02C 7/18 290/31 |
| 2017/0234235 | A1* | 8/2017 | Pech | F02N 11/0862 290/31 |
| 2017/0234236 | A1* | 8/2017 | Feulner | F01D 19/02 60/778 |
| 2017/0234237 | A1* | 8/2017 | Pech | F02C 7/277 60/778 |
| 2017/0234238 | A1* | 8/2017 | Schwarz | F01D 25/34 60/778 |
| 2017/0335770 | A1* | 11/2017 | Glahn | F02C 7/14 |
| 2018/0094584 | A1* | 4/2018 | Chalaud | F04C 28/125 |
| 2018/0128124 | A1* | 5/2018 | Avis | F01D 5/02 |
| 2018/0283211 | A1* | 10/2018 | Parnin | F01D 25/164 |
| 2018/0371969 | A1* | 12/2018 | McCormick | F16H 57/0413 |
| 2019/0186368 | A1* | 6/2019 | Sharma | F01D 25/34 |
| 2019/0249602 | A1* | 8/2019 | Nayani | F16N 39/02 |
| 2019/0309665 | A1* | 10/2019 | Maalouf | F02C 7/06 |
| 2020/0063660 | A1* | 2/2020 | Mackin | F01M 5/002 |

FOREIGN PATENT DOCUMENTS

| | | |
|---|---|---|
| CN | 107420201 A | 12/2017 |
| WO | WO2014/143284 A1 | 9/2014 |
| WO | WO2014/189588 A2 | 11/2014 |

* cited by examiner

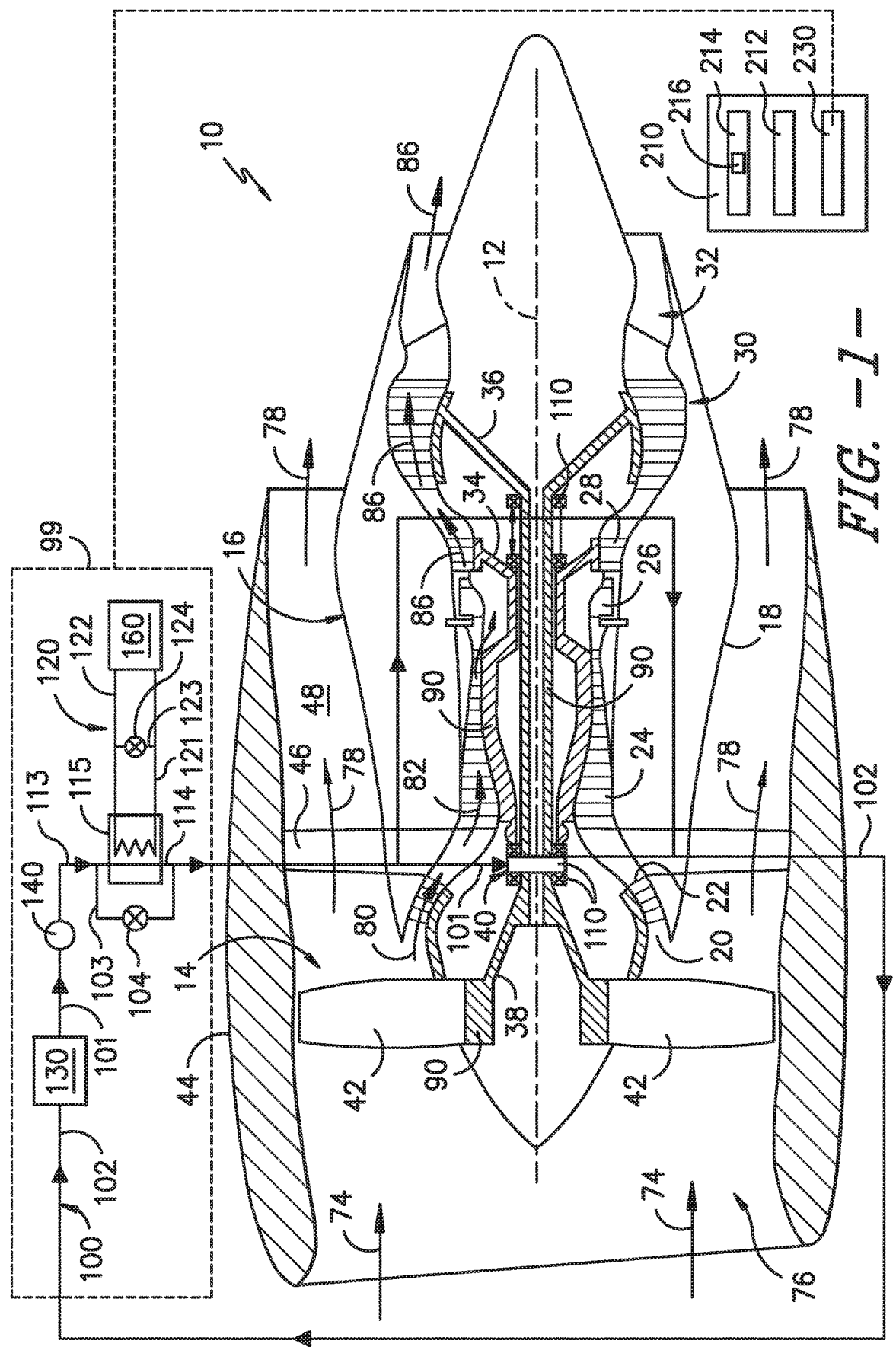
FIG. -1-

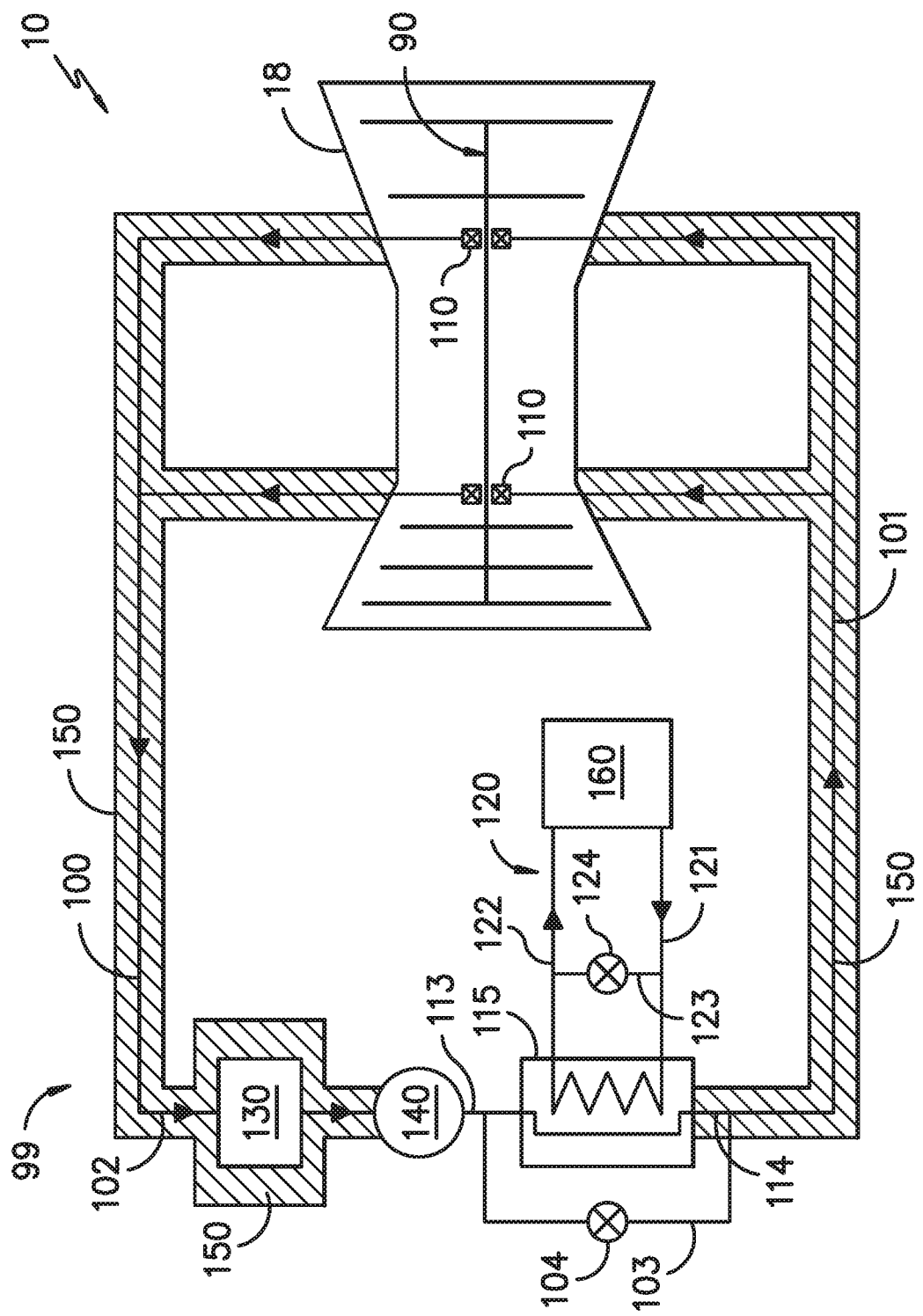
FIG. -2-

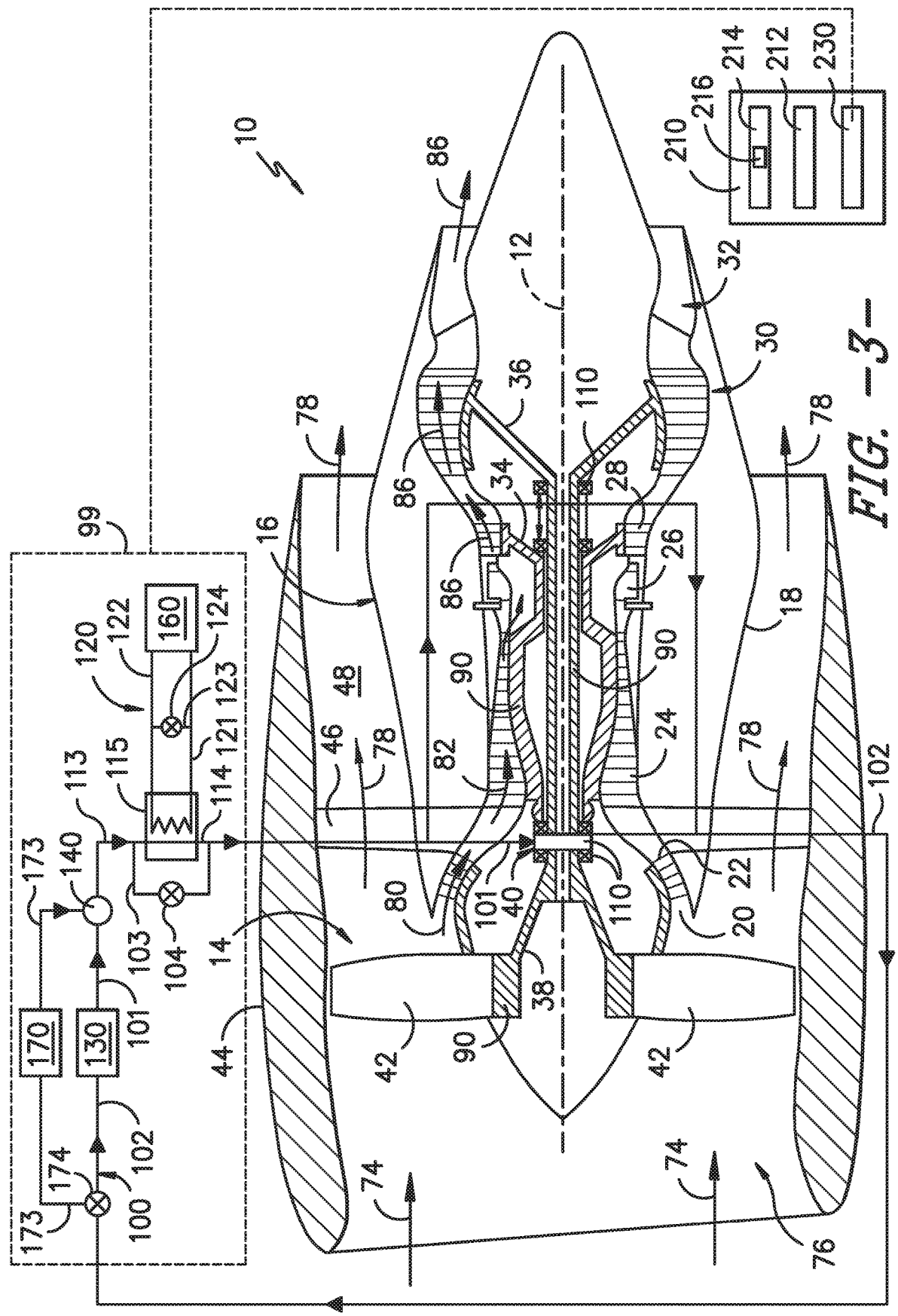
FIG. -3-

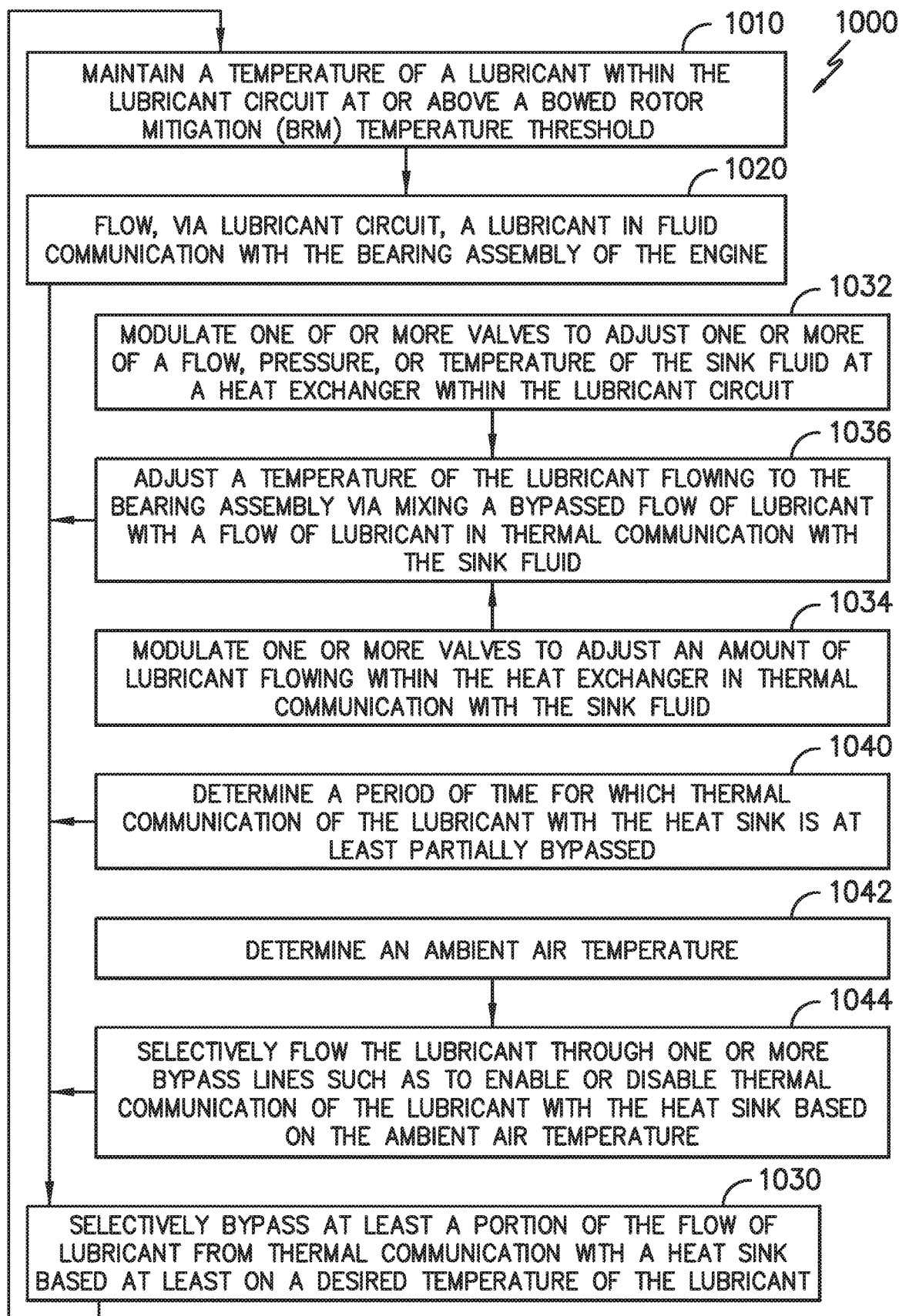
FIG. -4-

METHOD AND STRUCTURE FOR OPERATING ENGINE WITH BOWED ROTOR CONDITION

FIELD

The present subject matter relates generally to gas turbine engines. More specifically, the present subject matter relates to methods and structures for alleviating a bowed rotor condition at a gas turbine engine.

BACKGROUND

During operation of a gas turbine engine, heat accumulates at rotor assemblies. Following shutdown of the engine, the accumulated heat at the rotor assembly is asymmetrically or non-uniformly released such as to define a thermal gradient that induces distortion or bowing of the rotor assembly. Such bowing, referred to as thermal bowing or as defining a bowed rotor condition in the engine, creates eccentricity of the rotor assembly relative to an axial centerline axis and surrounding casings. Thermal bowing further results in increased unbalance at the rotor assembly. Such unbalance and eccentricities result in the rotor assembly making undesired contact at the surrounding casing, resulting in damage to the surrounding casing, the rotor assembly, or a bearing assembly. Such damage may result in engine failure or necessitate maintenance or overhaul of the engine, resulting in increased engine operating costs.

Known solutions for alleviating a bowed rotor condition include dry motoring (i.e., rotating the engine without fuel) the rotor assembly to reduce the thermal gradient, thereby reducing eccentricity of the rotor assembly relative to the surrounding casings. However, such solutions may include dry motoring the rotor assembly using known starter/motor systems. However, known dry motoring systems and methods include relatively long periods of dry motoring that adversely affect an amount of time to start or re-start an engine following shutdown. Such relatively long periods adversely affect an ability of commercial engine operators (e.g., airlines) to load an aircraft and begin taxi and takeoff such as to increase operating costs.

As such, there is a need for methods and structures for more expediently alleviating thermal bowing in rotor assemblies of gas turbine engines.

BRIEF DESCRIPTION

Aspects and advantages of the invention will be set forth in part in the following description, or may be obvious from the description, or may be learned through practice of the invention.

An aspect of the present disclosure is directed to a gas turbine engine, and method of operation, including a lubricant system defining a lubricant circuit through which a lubricant flows in fluid communication with a bearing assembly of the engine. The lubricant system selectively bypasses thermal communication of the lubricant and a heat sink based at least on a temperature of the lubricant within the lubricant circuit.

In one embodiment, selectively bypassing thermal communication of the lubricant with a heat sink is further based on a vibratory response of a rotor assembly of the gas turbine engine. In another embodiment, selectively bypassing thermal communication of the lubricant with the heat sink includes modulating one or more valves to adjust one or more of a flow, pressure, or temperature of the sink fluid at the heat exchanger within the lubricant circuit. In still another embodiment, selectively bypassing thermal communication includes modulating one or more valves to adjust an amount of lubricant flowing within the heat exchanger in thermal communication with the sink fluid. In still yet another embodiment, selectively bypassing thermal communication includes adjusting a temperature of the lubricant flowing to the bearing assembly via mixing a bypassed flow of lubricant with a flow of lubricant in thermal communication with the sink fluid. In another embodiment, flowing the lubricant in fluid communication with the bearing assembly further includes flowing the lubricant in serial flow arrangement through the lubricant circuit from a lubricant reservoir to a heat exchanger to the bearing assembly of the engine.

In various embodiments, the engine determines a period of time for which thermal communication of the lubricant with the sink fluid is at least partially bypassed. In one embodiment, determining the period of time for which thermal communication of the lubricant with the heat sink is at least partially bypassed is further based on an environmental condition.

In various embodiments, the lubricant system includes an insulating material at least partially surrounding one or more of a lubricant reservoir, a heat exchanger, or the lubricant circuit. In one embodiment, the lubricant system further includes a supply line coupled from a lubricant reservoir to the bearing assembly of the engine. A heat exchanger is disposed along the supply line between the lubricant reservoir and the bearing assembly.

In another embodiment, the lubricant system further includes a lubricant bypass line defined between a lubricant inlet line to a heat exchanger and a lubricant outlet line from the heat exchanger. The lubricant bypass line further includes a lubricant bypass valve configured to selectively flow at least a portion of the lubricant from the lubricant inlet line to the lubricant outlet line bypassing the heat exchanger.

In still another embodiment, the engine further includes a sink fluid circuit through which the sink fluid flows. The sink fluid circuit includes a sink fluid bypass line defined between a sink fluid inlet line to a heat exchanger and a sink fluid outlet line from the heat exchanger, wherein the sink fluid bypass line further comprises a sink fluid bypass valve configured to selectively flow at least a portion of the sink fluid from the sink fluid inlet line to the sink fluid outlet thermal communication of at least a portion of the sink fluid from the lubricant.

In various embodiments, the lubricant system further includes a lubricant reservoir bypass line defined from a lubricant scavenge line to a lubricant supply line. The lubricant reservoir bypass line selectively bypasses thermal communication between the lubricant and a lubricant reservoir.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an exemplary schematic embodiment of a gas turbine engine incorporating a lubricant system according to an aspect of the present disclosure;

FIG. 2 is another exemplary schematic embodiment of the engine and lubricant system of FIG. 1 according to an aspect of the present disclosure;

FIG. 3 is another exemplary schematic embodiment of a gas turbine engine incorporating a lubricant system according to an aspect of the present disclosure; and FIG. 4 is a flowchart outlining exemplary steps of a method for operating a gas turbine engine to remove thermal bowing at a rotor assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Methods and structures for more expediently alleviating thermal bowing in rotor assemblies of gas turbine engines are generally provided. The structures and methods include a lubricant system, and operation thereof, configured to increase damper effectiveness at a bearing assembly such as to decrease an amount of dry motoring time utilized to alleviate a bowed rotor condition at the rotor assembly. The lubricant system and methods for operation include maintaining a temperature threshold of lubricant to improve damper effectiveness at the bearing assembly. By maintaining or increasing lubricant temperature at a damper assembly of the bearing assembly, the lubricant system reduces dynamic magnification during a bowed rotor start, thereby reducing or eliminating undesired contact between the rotor assembly and a surrounding casing and improving engine durability.

Referring now to the drawings, FIG. 1 is a schematic partially cross-sectioned side view of an exemplary gas turbine engine 10 herein referred to as "engine 10" as may incorporate various embodiments of the present invention. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the gas turbine engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

It should be appreciated that combinations of the shaft 34, 36, the compressors 22, 24, and the turbines 28, 30 define a rotor assembly 90 of the engine 10. For example, the HP shaft 34, HP compressor 24, and HP turbine 28 may define an HP rotor assembly of the engine 10. Similarly, combinations of the LP shaft 36, LP compressor 22, and LP turbine 30 may define an LP rotor assembly of the engine 10. Various embodiments of the engine 10 may further include the fan shaft 38 and fan blades 42 as the LP rotor assembly. In other embodiments, the engine 10 may further define a fan rotor assembly at least partially mechanically de-coupled from the LP spool via the fan shaft 38 and the reduction gear 40. Still further embodiments may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrows 80, enters the core engine 16 through a core inlet 20 defined at least partially via the outer casing 18. The flow of air 80 is increasingly compressed as it flows across successive stages of the compressors 22, 24, such as shown schematically by arrows 82. The compressed air 82 enters the combustion section 26 and mixes with a liquid or gaseous fuel and is ignited to produce combustion gases 86. The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 entering the engine inlet 20 bypasses the core engine 16 and flows across the bypass airflow passage 48, such as shown schematically by arrows 78.

The engine 10 further includes a plurality of bearing assemblies 110 disposed at the rotor assemblies 90 of the engine 10. The bearing assembly 110 supports rotation of the rotor assembly relative to a surrounding static structure or casing of the engine 10. The bearing assembly 110 generally includes a damper assembly to limit or compensate for vibrations, oscillations, or unbalance from the rotor assembly 90 during operation of the engine 10. The bearing assembly 110 generally requires a lubricant, such as oil, to enable rotation of the rotor assembly, reduce heat or thermal accumulation at the bearing assembly 110, and provide damping of vibrations from rotation of the rotor assembly 90.

Referring still to FIG. 1, in conjunction with FIG. 2, an exemplary schematic of a lubricant system 99 of the engine 10 is generally provided. The lubricant system 99 defines a lubricant circuit 100 through which a lubricant (e.g., oil) flows in fluid communication with the bearing assemblies 110 of the engine 10. The lubricant system 99 generally includes a sink fluid circuit 120 through which a sink fluid flows (e.g., fuel, hydraulic fluid, air, refrigerant, etc.) from a fluid system 160 (e.g., fuel system, hydraulic fluid system, air supply system, refrigerant supply system, etc.). In various embodiments, the lubricant system 99 further includes a lubricant reservoir 130 and a heat exchanger 115 disposed along the lubricant circuit 100. The lubricant reservoir 130 may generally be defined upstream of the heat exchanger 115 along the lubricant circuit 100. For example, the lubricant reservoir 130 is generally disposed along a lubricant scavenge line 102 from the bearing assembly 110 to the lubricant reservoir 130. As another example, the heat exchanger 115 is defined generally along a lubricant supply line 101 coupled from the lubricant reservoir 130 to the bearing assembly 110. The heat exchanger 115 is disposed along the lubricant supply line 101 between the lubricant reservoir 130 and the bearing assembly 110. The lubricant system 99 may further include a pump 140 to provide the lubricant from the lubricant reservoir 130 to the heat exchanger 115. In various embodiments, the lubricant system 99 is configured to at least partially bypass a flow of the lubricant from thermal communication with the heat exchanger 115.

In one embodiment of the lubricant system 99, the sink fluid circuit 120 includes a sink fluid bypass line 123 defined between a sink fluid inlet line 121 to the heat exchanger 115 and a sink fluid outlet line 122 from the heat exchanger 115. The sink fluid bypass line 123 further includes a sink fluid bypass valve 124 configured to selectively flow at least a portion of the sink fluid from the sink fluid inlet line 121 to the sink fluid outlet line 122 such as to bypass thermal communication of at least a portion of the sink fluid from the lubricant. For example, the sink fluid bypass line 123 and the sink fluid bypass valve 124 may bypass at least a portion of the flow of sink fluid from entering the heat exchanger 115 to prevent or limit thermal communication of the sink fluid with the lubricant at the heat exchanger 115.

In another embodiment of the lubricant system 99, the lubricant system 99 includes a lubricant bypass line 103 defined between a lubricant inlet line 113 to a heat exchanger 115 and a lubricant outlet line 114 from the heat exchanger 115. The lubricant bypass line 103 further includes a lubricant bypass valve 104 configured to selectively flow at least a portion of the lubricant from the lubricant inlet line 113 to the lubricant outlet line 114 bypassing thermal communication with the sink fluid. For example, the lubricant bypass line 103 and lubricant bypass valve 104 may bypass at least a portion of the flow of lubricant from entering the heat exchanger 115 to prevent or limit thermal communication of the lubricant with the sink fluid at the heat exchanger 115.

Referring now to FIG. 3, another exemplary embodiment of the engine 10 is generally provided. The engine 10 provided in FIG. 3 is configured substantially similarly as shown and described in regard to FIGS. 1-2. However, in FIG. 3, the lubricant circuit 100 further defines a lubricant reservoir bypass line 173 from the lubricant scavenge line 102 to the lubricant supply line 101. The lubricant reservoir bypass line 173 further includes a lubricant reservoir bypass valve 174 disposed at the lubricant scavenge line 102 and the lubricant reservoir bypass line 173. The lubricant reservoir bypass valve 174 selectively bypasses thermal communication or heat transfer between the lubricant through the lubricant circuit 100 and the lubricant reservoir 130. For example, the lubricant reservoir 130 may generally define a relatively cold system such as to decrease a temperature of the lubricant within the lubricant circuit 100. As such, the lubricant reservoir bypass line 173 enables bypassing flow of lubricant from entering the relatively cold lubricant reservoir so as to maintain or mitigate a decrease in temperature of the lubricant before entering the bearing assembly 110.

Referring still to FIG. 3, the lubricant reservoir bypass line 173 may further be coupled to the pump 140 downstream of the lubricant reservoir 130. The pump 140 generates a flow/pressure of the lubricant through the lubricant circuit 100. In various embodiments, the lubricant reservoir bypass line 173 may further include a separator 170 (e.g., an air-lubricant separator) such as to remove gas from the flow or lubricant. The separator 170 may be disposed between the lubricant reservoir bypass valve 174 and the pump 140. In various embodiments, the lubricant reservoir 130 includes a separator, such as the separator 170. In other embodiments, the separator 170 may be disposed generally downstream of the bearing assembly 110 along the lubricant scavenge line 102. As such, the separator 170 may be defined separately of the lubricant reservoir 130, and upstream thereof, along the lubricant scavenge line 102. As another example, the separator 170 may be defined along the lubricant reservoir bypass line 173 such as to remove gas from the flow of lubricant bypassing the lubricant reservoir 130.

In various embodiments, the engine 10 includes a controller 210 to operate to lubricant system 99 to selectively bypass thermal communication of the lubricant and a heat sink (e.g., the sink fluid, heat exchanger 115, and/or the lubricant reservoir 130) based at least on a temperature of the lubricant within the lubricant circuit 100. The lubricant system 99 selectively bypasses thermal communication or heat transfer between the lubricant and the heat sink (e.g., the sink fluid. heat exchanger 115, and/or the lubricant reservoir 130) such as to maintain or increase a temperature of the lubricant to improve damper properties of the lubricant at the bearing assembly 110. Maintaining the lubricant at or above a bowed rotor mitigation (BRM) temperature threshold enables reducing dynamic magnification during a bowed rotor start or bowed rotor operation of a rotor assembly 90 of the engine 10. As such, the lubricant system 99 enables reducing motoring time, adverse engine dynamics, undesired rotor to casing rub-ins, and associated deterioration in performance or operability of the engine 10. Still further, reducing motoring time improves startup time and engine and aircraft turnaround time, thereby improving engine and aircraft operational costs.

More specifically, the lubricant system 99 enables maintaining a temperature of the lubricant within a BRM temperature threshold such that relatively warm lubricant flows through the lubricant circuit 100 to the bearing assembly 110 during a cold start as the rotor assembly 90 defines a bowed rotor condition. Additionally, or alternatively, the lubricant system 99 enables maintaining a temperature of the lubricant within a BRM temperature threshold such that relatively warm lubricant following operation of the engine 10 maintains temperature or mitigates temperature decrease during shutdown of the engine 10.

Referring now to the exemplary flowchart provided in FIG. 4, a method for operating a gas turbine engine defining a bowed rotor condition is generally provided (hereinafter, "method 1000"). The method 1000 includes at 1010 maintaining a temperature of a lubricant within the lubricant circuit 100 at or above a bowed rotor mitigation (BRM) temperature threshold; and at 1020 flowing, via the lubricant circuit 100, a lubricant in fluid communication with the bearing assembly 110 of the engine 10.

Referring to FIGS. 1-4, in one embodiment, the method 1000 at 1010 may include applying an insulating material 150 (FIG. 2) to at least a portion of the lubricant system 99 such as to mitigate or decrease a rate of cooling of the lubricant within the lubricant system 99. For example, referring to FIG. 2, the insulating material 150 may be disposed around, inside, or at the lubricant reservoir 130, the lubricant circuit 100 (i.e., walls surrounding and defining the lubricant circuit 100), or both. In one embodiment, the insulating material 150 is a coating on or inside the lubricant reservoir 130, the lubricant circuit 100, or both. In still various embodiments, the lubricant circuit 100 or lubricant reservoir 130 may define one or more wall thicknesses or thicknesses of insulating material 150 such as to define one or more heat transfer rates.

In various embodiments, the insulating material 150 may include a thermoplastic or thermoset polymer, or polymers including organic or synthetic units, such as, but not limited to, polyurethane or phenol formaldehyde resins. The insulating material 150 defining at least a polymer material may further include fiber reinforcement materials such as, but not limited to, cotton, paper, glass, or wood fibers. In still various embodiments, the insulating material 150 may include one or more refractory materials, such as, but not limited to, oxides of aluminum, silicon, magnesium, or zirconium, carbon, tungsten, boron nitride, or combinations thereof. Still further embodiments may define the insulating material 150 as an asbestos or a mineral wool, including, but not limited to, rock wool, stone wool, slag wool, or glass wool. As such, the insulating material 150 may enable maintaining a temperature of the lubricant within the lubricant system 99 at or above the BRM temperature threshold such as to provide desired damping properties of the lubricant at the bearing assembly 110 during bowed rotor operation of the engine 10.

Referring back to FIGS. 1-2, in various embodiments, the method 1000 may further include at 1030 selectively bypassing, at least in part, a flow of lubricant from thermal communication with a heat sink based at least on a desired temperature of the lubricant. In various embodiments, bypassing the flow of lubricant from thermal communication with a heat sink includes bypassing the lubricant from thermal communication with the heat exchanger 115. In one embodiment, bypassing the heat exchanger 115 includes bypassing the flow of lubricant from thermal communication with the sink fluid within the sink fluid circuit 120 based at least on a desired temperature of the lubricant.

In another embodiment, selectively bypassing the flow of lubricant from thermal communication with the heat sink includes bypassing the lubricant reservoir 130. In one embodiment, bypassing the lubricant reservoir 130 includes bypassing the flow of lubricant from thermal communication with the lubricant reservoir 130 via the lubricant reservoir bypass line 173.

In various embodiments, the method 1000 at 1030 is further based on a vibratory response from a rotor assembly of the engine. For example, the vibratory response may include measuring or monitoring a vibratory measurement (e.g., via an accelerometer) at the rotor assembly 90, a surrounding casing (e.g., outer casing 18), or a gap (e.g., radial gap) between the rotor assembly 90 and the surrounding casing.

In one embodiment, the method 1000 further includes at 1032 modulating one or more valves to adjust one or more of a flow, pressure, or temperature of the sink fluid at a heat exchanger within the lubricant circuit. For example, modulating the sink fluid bypass valve 124 adjusts an amount of the sink fluid that enters the heat exchanger 115 in thermal communication with the lubricant at the heat exchanger 115 versus an amount of the sink fluid that bypasses the heat exchanger 115 via the sink fluid bypass line 123. As such, the lubricant system 99 maintains the lubricant within the lubricant circuit 100 within a desired temperature range, such as above the BRM temperature threshold, such as to provide desired damper properties (e.g., a desired viscosity) of the lubricant at the bearing assembly 110.

In another embodiment, the method 1000 further includes at 1034 modulating one or more valves to adjust an amount of lubricant flowing within the heat exchanger in thermal communication with the sink fluid. For example, modulating the lubricant bypass valve 104 adjusts an amount of the lubricant that enters the heat exchanger 115 in thermal communication with the sink fluid at the heat exchanger 115 versus an amount of the lubricant that bypasses the heat exchanger 115 via the lubricant bypass line 103. As such, the lubricant system 99 maintains the lubricant within the lubricant circuit 100 within a desired temperature range, such as above the BRM temperature threshold, such as to provide desired damper properties (e.g., a desired viscosity) of the lubricant at the bearing assembly 110.

In still various embodiments, the method 1000 further includes at 1036 adjusting a temperature of the lubricant flowing to the bearing assembly via mixing a bypassed flow of lubricant with a flow of lubricant in thermal communication with the sink fluid. For example, referring to the method 1000 at 1034, adjusting the temperature of the lubricant flowing to the bearing assembly 110 includes selectively modulating the lubricant bypass valve 104 such as to mix a relatively warmer flow of lubricant bypassing the heat exchanger 115 via the lubricant bypass line 103 with a relatively cooler flow of lubricant egressing the heat exchanger 115 following thermal communication (e.g., heat transfer) in the heat exchanger 115. In still various embodiments, thermal communication in the heat exchanger 115 includes heat transfer with the sink fluid or via fins and structures of the heat exchanger 115 to dissipate heat, or combinations thereof.

It should be appreciated that in various embodiments of the lubricant system 99 including the insulating material 150 and one or more of the bypass valves 104, 124, maintaining the temperature of the lubricant at or above the BRM temperature threshold further includes maintaining the lubricant temperature within a safe operating temperature. For example, the safe operating temperature may generally include a maximum temperature based on the bearing assembly 110. For example, safe operating temperature of the bearing assembly 110 may include, but is not limited to, a desired viscosity for proper operation of one or more seals, bearings elements, bearing surfaces, dampers, etc. of the bearing assembly 110.

As such, it should be appreciated that it is generally desired in the art to reduce lubricant temperature to ensure safe and effective operation of one or more components of the bearing assembly. As such, lubricant systems generally promote maximum heat transfer from the lubricant to one or more sink fluids and/or heat exchangers. However, embodiments of the lubricant system 99 and methods 1000 for operation enable maintaining the lubricant temperature within a desired range above the BRM temperature threshold such as to ensure safe operation of the engine 10 while mitigating undesired vibrations, oscillations, and unbalance during bowed rotor startup of the engine 10.

In one embodiment of the method 1000 at 1020, flowing the lubricant in fluid communication with the bearing assembly further includes flowing the lubricant at least partially in serial flow arrangement through the lubricant circuit 100 from the lubricant reservoir 130 to the heat exchanger 115 to the bearing assembly 110 of the engine 10. For example, when the lubricant is in full thermal communication with the heat exchanger 115 and/or sink fluid, flowing the lubricant at 1020 is generally in serial flow arrangement from the lubricant reservoir 130 to the heat exchanger 115 to the bearing assembly 110. As another example, when the lubricant is in partial thermal communication with the heat exchanger 115 and/or sink fluid, one or more of the lubricant bypass line 103 and/or the sink fluid bypass line 123 is utilized to limit heat transfer from the lubricant such as to maintain the temperature of the lubricant at or above the BRM temperature threshold.

In still various embodiments, the method 1000 further includes at 1040 determining a period of time for which thermal communication of the lubricant with the heat sink (e.g., the sink fluid, heat exchanger 115, and/or the lubricant reservoir 130) is at least partially bypassed. In various embodiments, the period of time is based at least on a vibratory response at the rotor assembly 90 or a surrounding casing (e.g., nacelle 44, outer casing 18, etc.). Determining the period of time for which thermal communication of the lubricant with the heat sink (e.g., the sink fluid, heat exchanger 115, and/or the lubricant reservoir 130) is at least partially bypassed may be based on maintaining the lubricant above the BRM temperature threshold and within a safe operating range (e.g., below a maximum lubricant temperature), such as described above herein. Still further, the period of time may be based further on an environmental condition, such as, but not limited to, an outside or ambient air temperature, air speed, air pressure, an elapsed time between prior engine shutdown and re-start, or a surface or proximate air temperature at the rotor assembly 90.

In still various embodiments, the method 1000 further includes at 1042 determining an ambient air temperature; and at 1044 selectively flowing the lubricant through one or more bypass lines 103, 173 such as to enable or disable thermal communication of the lubricant with the heat sink (e.g., the sink fluid, the heat exchanger 115, and/or the lubricant reservoir 130) based on the ambient air temperature. In one embodiment, if the ambient air temperature is less than or equal to the BRM temperature threshold, at least a portion of the lubricant flows through one or more of the bypass line 103, 123, 173 to disable thermal communication with the heat sink such as to increase the lubricant temperature above the BRM temperature threshold. For example, if the ambient air temperature is less than or equal to the BRM temperature threshold, one or more of the bypass valves 104, 124, 174 is modulated to disable thermal communication of the lubricant with the heat sink. In another embodiment, if the ambient air temperature is greater than the BRM temperature threshold, one or more of the bypass valves 104, 124, 174 is modulated to enable thermal communication of the lubricant with the heat sink such as to decrease the temperature of the lubricant.

In still various embodiments, the method 1000 may be implemented during startup of the engine 10 from rest or zero revolutions per minute (RPM) to a combustion/ignition speed (i.e., a speed at which fuel is provided to flows of compressed air 82 and ignited to produce combustion gases 86) and idle condition (i.e., a minimum steady state speed of the rotor assembly 90 via extraction of energy from the combustion gases 86) of the engine 10. In other embodiments, the method 1000 may be implemented during shutdown of the engine 10 from the idle condition to rest or zero RPM.

Various embodiments of the lubricant system 99 and methods for operation 1000 generally define an active or passive system or method for operating the engine 10 to mitigate undesired vibrations due to operation of the rotor assembly 90 defining a bowed rotor condition. Referring back to FIG. 1, the engine 10 may also include a controller 210 configured to store and execute instructions to perform operations, such as one or more of the steps of embodiments of the method 1000 provided herein. The controller 210 is further configured to communicate, command, receive, or store instructions or data for operating the engine 10 including the lubricant system 99. In general, the controller 210 can correspond to any suitable processor-based device, including one or more computing devices. For instance, FIG. 1 illustrates one embodiment of suitable components that can be included within the controller 210.

As shown in FIG. 1, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as those outlined in the method 1000 and embodiments thereof. As such, the instructions may include one or more steps of the method 1000. Still further, the operations may include executing one or more steps of the method 1000 to actively mitigate undesired vibrations during operation of the engine 10 defining a bowed rotor condition. In various embodiments, the memory 214 may further include one or tables, charts, functions, or graphs storing data that may correspond a lubricant temperature, an ambient temperature, a vibratory response, or a rotational speed of the rotor assembly 90 to a desired function of the bypass valves 104, 124 such as to produce a desired lubricant temperature (i.e., at or above the BRM temperature threshold) for the desired period of time.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive data from the bearing assembly 110, the rotor assembly 90, or a surrounding casing (e.g., nacelle 44, outer casing 18). The data may include, but is not limited to, vibration data, surface temperature, fluid temperature, pressure, and/or flow rate, or rotational speed or acceleration. In addition, the communications interface module 230 can also be used to communicate with any other suitable components of the engine 10, including any number of sensors configured to monitor one or more operating parameters of the engine 10, such as, but not limited to, rotational speed and acceleration of the rotor assembly 90, a flow of fuel (or a pressure, volume, area, or other geometry, or density of fuel, etc. utilized to calculate the flow of fuel) to the combustion section 26, a pressure, temperature, density, etc. of the air 80, 82 around the engine 10 and therethrough, or a flow of lubricant or sink fluid (or a pressure, volume, area, or other geometry, or density, etc. utilized to calculate the flow of lubricant). It should be appreciated that the communications interface module 230 can be any combination of suitable wired and/or wireless communications interfaces and, thus, can be communicatively coupled to one or more components of the engine 10 via a wired and/or wireless connection.

It should be appreciated that although the method 1000 is provided and described in regard to embodiments of the engine 10 and the lubricant system 99, the method 1000 may further be implemented or executed in other suitable embodiments of engine and lubricant system such as to maintain the lubricant temperature above a bowed rotor mitigation temperature threshold. Still further, embodiments of the engine 10 including the lubricant system 99 may define one or more passive structures or systems such as to enable and disable bypass of the flow of lubricant in thermal communication with the heat sink. Passive structures may include, but are not limited to, shape memory alloys, thermoelectric actuators, pressure valves, pressure, temperature, or flow switches, rotor assembly speed dependent devices, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for operating a gas turbine engine defining a bowed rotor condition, the system comprising one or more processors and one or more memory devices storing instructions that when executed by the one or more processors causes the processors to perform operations, the operations comprising:
   flowing, via a lubricant circuit, a lubricant through in fluid communication with a bearing assembly of the engine; and
   selectively bypassing, at least in part, a flow of lubricant from thermal communication with a heat sink based at least on a desired temperature of the lubricant, wherein selectively bypassing thermal communication of the lubricant with the heat sink is further based on a vibratory response of a rotor assembly of the gas turbine engine.

2. The system of claim 1, the operations further comprising:
   determining a period of time for which thermal communication of the lubricant with a_sink fluid is at least partially bypassed.

3. The system of claim 2, wherein determining the period of time for which thermal communication of the lubricant with the heat sink is at least partially bypassed is further based on an environmental condition.

4. The system of claim 1, wherein selectively bypassing thermal communication of the lubricant with the heat sink comprises modulating one or more valves to adjust one or more of a flow, pressure, or temperature of the heat sink at the heat exchanger within the lubricant circuit.

5. The system of claim 1, wherein selectively bypassing thermal communication of the lubricant with the heat sink further comprises:
   modulating one or more valves to adjust an amount of lubricant flowing within a heat exchanger at the heat sink in thermal communication with a sink fluid.

6. The system of claim 1, wherein selectively bypassing thermal communication of the lubricant with the heat sink further comprises:
   adjusting a temperature of the lubricant flowing to the bearing assembly via mixing a bypassed flow of lubricant with a flow of lubricant in thermal communication with a sink fluid.

7. The system of claim 1, wherein flowing the lubricant in fluid communication with the bearing assembly further comprises flowing the lubricant in serial flow arrangement through the lubricant circuit from a lubricant reservoir to a heat exchanger to the bearing assembly of the engine.

8. A gas turbine engine, the engine comprising:
   a rotor assembly; and
   a lubricant system defining a lubricant circuit through which a lubricant flows in fluid communication with a bearing assembly of the engine, wherein the lubricant system selectively bypasses thermal communication of the lubricant and a heat sink based at least on a temperature of the lubricant within the lubricant circuit, and wherein the lubricant system selectively bypasses thermal communication of the lubricant with the heat sink based on a vibratory response of the rotor assembly.

9. The gas turbine engine of claim 8, wherein the lubricant system comprises an insulating material at least partially surrounding one or more of a lubricant reservoir, a heat exchanger, or the lubricant circuit.

10. The gas turbine engine of claim 8, the lubricant system further comprising:
a supply line coupled from a lubricant reservoir to the bearing assembly of the engine, wherein a heat exchanger is disposed along the supply line between the lubricant reservoir and the bearing assembly.

11. The gas turbine engine of claim 8, the lubricant system further comprising:
a lubricant bypass line defined between a lubricant inlet line to a heat exchanger and a lubricant outlet line from the heat exchanger, wherein the lubricant bypass line further comprises a lubricant bypass valve configured to selectively flow at least a portion of the lubricant from the lubricant inlet line to the lubricant outlet line bypassing the heat exchanger.

12. The gas turbine engine of claim 8, the engine further comprising:
a sink fluid circuit through which the sink fluid flows, wherein the sink fluid circuit comprises a sink fluid bypass line defined between a sink fluid inlet line to a heat exchanger and a sink fluid outlet line from the heat exchanger, wherein the sink fluid bypass line further comprises a sink fluid bypass valve configured to selectively flow at least a portion of the sink fluid from the sink fluid inlet line to the sink fluid outlet thermal communication of at least a portion of the sink fluid from the lubricant.

13. The gas turbine engine of claim 8, the lubricant system further comprising:
a lubricant reservoir bypass line defined from a lubricant scavenge line to a lubricant supply line, wherein the lubricant reservoir bypass line selectively bypasses thermal communication between the lubricant and a lubricant reservoir.

14. A method for operating a gas turbine engine defining a bowed rotor condition, the method comprising:

maintaining a temperature of a lubricant within a lubricant circuit at or above a bowed rotor mitigation (BRM) temperature threshold, wherein maintaining the temperature of the lubricant comprises selectively bypassing, at least in part, the lubricant from thermal communication with a heat sink based at least on maintaining the temperature of the lubricant at or above the BRM temperature threshold, and wherein selectively bypassing thermal communication of the lubricant with the heat sink is further based on a vibratory response of a rotor assembly of the gas turbine engine; and flowing the lubricant through the lubricant circuit in fluid communication with a bearing assembly of the engine.

15. The method of claim 14, wherein flowing the lubricant through the lubricant circuit further comprises:
selectively bypassing, at least in part, a flow of lubricant from thermal communication with a heat sink based at least on a desired temperature of the lubricant.

16. The method of claim 15, wherein selectively bypassing thermal communication of the lubricant with the heat sink further comprises:
modulating one or more valves to adjust one or more of a flow, pressure, or temperature of the sink fluid at a heat exchanger within the lubricant circuit.

17. The method of claim 15, wherein selectively bypassing thermal communication of the lubricant with the heat sink further comprises:
modulating one or more valves to adjust an amount of lubricant flowing within the heat exchanger in thermal communication with the sink fluid.

18. The method of claim 14, wherein selectively bypassing thermal communication of the lubricant with the heat sink is based on a determined ambient air temperature.

\* \* \* \* \*